(12) United States Patent
Kanno (10) Patent No.: US 6,899,969 B2
(45) Date of Patent: May 31, 2005

(54) FUEL CELL SYSTEM AND FREEZING PREVENTION METHOD THEREOF

(75) Inventor: Yoshihito Kanno, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 355 days.

(21) Appl. No.: 10/198,360

(22) Filed: Jul. 19, 2002

(65) Prior Publication Data

US 2003/0017375 A1 Jan. 23, 2003

(30) Foreign Application Priority Data

Jul. 19, 2001 (JP) ........................................ 2001-219978

(51) Int. Cl.$^7$ ................................................ H01M 8/04
(52) U.S. Cl. ............................ 429/24; 429/26; 429/13; 429/22; 429/34; 429/38; 429/39
(58) Field of Search .............................. 429/24, 26, 13, 429/22, 34, 38, 39

(56) References Cited

U.S. PATENT DOCUMENTS 4,640,873 A 2/1987 Tajima et al.

6,713,729 B2 * 3/2004 Takeo et al. ................ 219/485

FOREIGN PATENT DOCUMENTS

| DE | 198 25 286 | 12/1998 |
|----|------------|---------|
| DE | 199 45 715 | 4/2001 |
| JP | 6-223855 | 8/1994 |
| WO | WO 00/74163 | 12/2000 |

* cited by examiner

Primary Examiner—Patrick Joseph Ryan
Assistant Examiner—Angela J. Martin
(74) Attorney, Agent, or Firm—Oblon, Spivak, McClelland, Maier & Neustadt, P.C.

(57) ABSTRACT

In a fuel cell system, a temperature sensor detects an internal temperature of a fuel cell. A cooling water pump is controlled so that it is stopped when the internal temperature of the fuel cell is equal to or lower than 0 degrees. A driving amount of the cooling water pump increases according to a rise in internal temperature of the fuel cell when the internal temperature is higher than 0 degrees. A degree of increase in driving amount is restrained when the internal temperature of the fuel cell is between 0 degrees and a predetermined temperature higher than 0 degrees.

19 Claims, 6 Drawing Sheets

FUEL CELL SYSTEM AND FREEZING PREVENTION METHOD THEREOF

INCORPORATION BY REFERENCE

The disclosure of Japanese Patent Application No. 2001-219978 filed on Jul. 19, 2001 including the specification, drawings, and abstract are incorporated herein by reference in its entirety.

BACKGROUND OF THE INVENTION

1. Field of the Invention

This invention relates to a fuel cell system including a fuel cell which gains electromotive force through an electrochemical reaction caused by the supply of a fuel gas containing hydrogen and an oxidizing gas containing oxygen, and to a freezing prevention method thereof 2. Description of the Related Art It is assumed that a fuel cell is used under various conditions when the fuel cell is used as a power source for traveling, as in the case of using the fuel cell as a power source for an electric vehicle. Therefore, the fuel cell is required to operate appropriately under the any assumed conditions.

For example, in the case of using the fuel cell in cold climates, water present in the fuel cell freezes when an internal temperature of the fuel cell drops down to equal to or lower than 0 degrees (Celsius). To prevent the above-mentioned problem, an art which extracts the cooling water from the cooling water channel in the fuel cell when the fuel cell stops operating has been suggested (e.g., a Japanese Patent Laid-Open Publication No. HEI 6-223855). In the above structure, the cooling water does not freeze in the cooling water channel even when the internal temperature of the fuel cell drops down to equal to or less than 0 degrees after the fuel cell stops operating. Therefore, no problem is caused when activating the fuel cell next time.

However, an art for preventing water generated by the electrochemical reaction in the fuel cell from freezing in the fuel cell in cold climates had not been known conventionally. As the electrochemical reaction progresses in the fuel cell, water is generated on the cathode side of the fuel cell. The water is immediately generated when the fuel cell is activated and the electrochemical reaction is started. The generated water condenses in channels for oxidizing gas supplying around the electrodes and on the cathode side when the internal temperature of the fuel cell is low. In addition, the generated water may freeze when the internal temperature is equal to or less than 0 degrees.

SUMMARY OF THE INVENTION

The present invention has been made to resolve the above-mentioned problems, and its object is to provide an art for preventing generated water from freezing in a fuel cell when the fuel cell is activated in cold climates.

To achieve the above-mentioned object, one aspect of the present invention is a fuel cell system generating electricity by an electrochemical reaction. The fuel cell system includes the fuel cell, a cooling medium channel which is formed in the fuel cell, a pump for supplying the cooling medium, a temperature sensor for detecting a temperature reflecting an internal temperature of the fuel cell, and a control portion for turning off the pump when the temperature detected by the temperature sensor is equal to or lower than a first predetermined temperature. The main purpose of the control portion is to prevent the generated water from freezing in the fuel cell, by turning off the pump when the temperature detected by the temperature sensor is equal to or lower than the first predetermined temperature.

Furthermore, the present invention includes a freezing prevention method in the fuel cell system including the fuel cell, the cooling medium channel for circulating a designated cooling medium in the fuel cell and the pump for adjusting a flow rate of the cooling medium in the cooling medium channel. The freezing prevention method includes a step for detecting a temperature reflecting the internal temperature of the fuel cell, and a step for maintaining the pump at rest when the temperature detected in the previous step is equal to or lower than the first predetermined temperature.

With the freezing prevention method including the steps described above, the cooling medium does not circulate under cold conditions.

In the fuel system of the present invention, the designated cooling medium may be a liquid whose freezing point is lower than that of water.

DETAILED DESCRIPTION OF THE PREFERRED EMBODIMENTS

The following explains aspects of the implementations of the present invention according to preferred embodiments in the following order.

Figure 1:
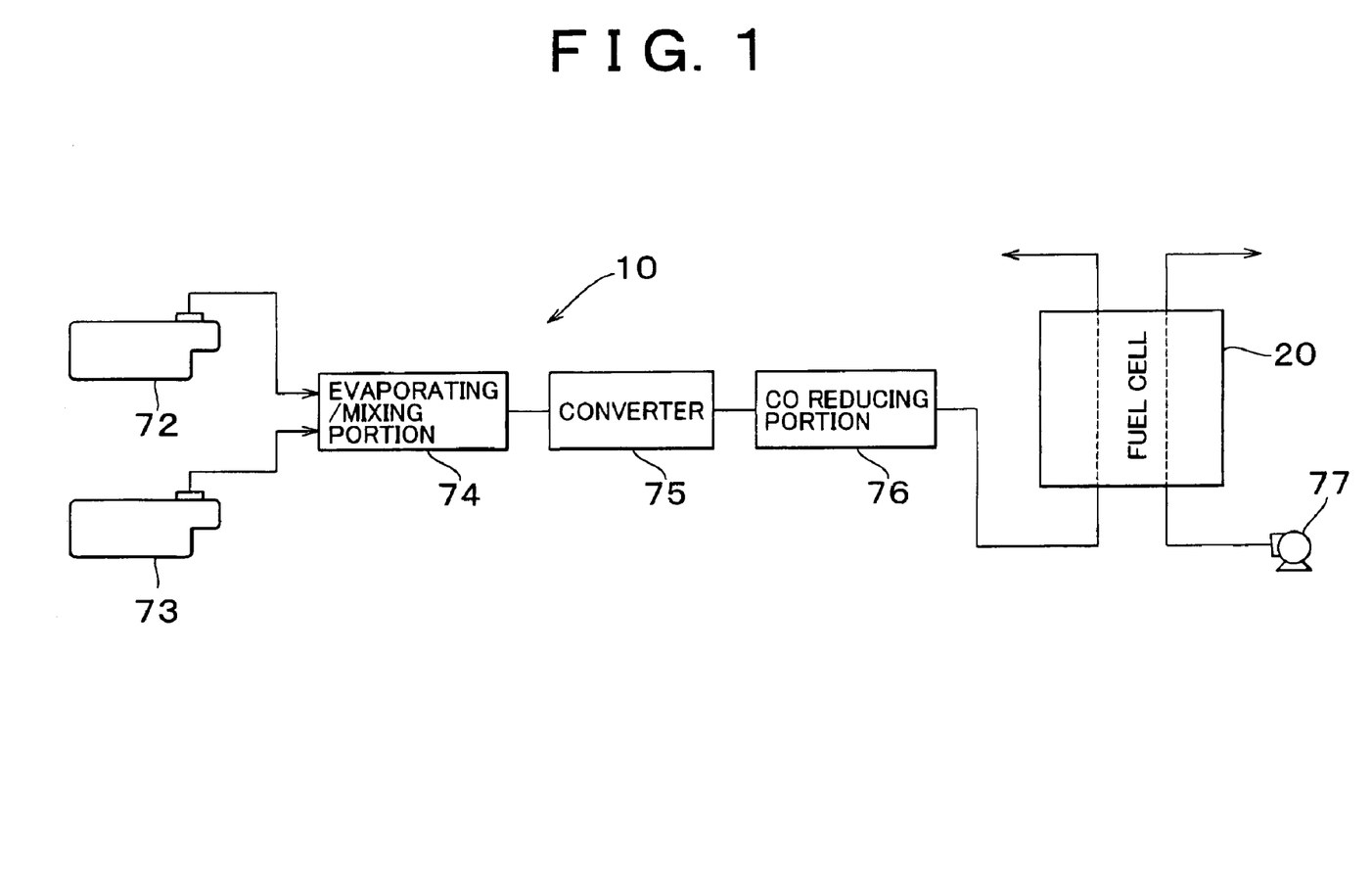
FIG. 1 is an explanatory drawing showing the configuration of a fuel cell system.

Overall configuration of device (flow of gas):

Overall configuration of device (flow of cooling water):

Internal configuration of a fuel cell 20:

Control of cooling water flow:

Example alternations in configuration:

Overall configuration of device (flow of gas):

FIG. 1 is an explanatory drawing showing the configuration of a fuel cell system 10 as one preferred embodiment of the present invention. First of all, the following explains the flow of gas supplied to a fuel cell according to FIG. 1. The fuel cell system 10 mainly includes a fuel tank 72 for storing fuel for conversion, a water tank 73 for storing water, an evaporating/mixing portion 74 for heating and mixing the fuel for conversion and the water, a converter 75 including a converting catalyst which promotes a converting reaction, a CO reducing portion 76 for reducing a carbon monoxide concentration of a converted gas, a fuel cell 20 and a blower 77.

The fuel for conversion, stored in the fuel tank 72, is supplied to the converting reaction which progresses at the converter 75. Various types of hydrocarbon fuels which form hydrogen by a converting reaction, such as liquid hydrocarbons including gasoline, alcohol including methane, aldehyde and natural gas can be the fuels for conversion. The evaporating/mixing portion 74 evaporates and heats the fuel for conversion supplied from the fuel tank 72 and the water supplied from the water tank 73 before mixing them.

The mixed gas, containing the fuel for conversion and the water, which has been discharged from the evaporating/mixing portion 74, is supplied to the converting reaction at the converter 75, resulting in forming the converted gas (hydrogen-rich gas). The converter 75 is provided with a converting catalyst according to the type of fuel for conversion supplied to the converting reaction. An internal temperature of the converter 75 is controlled so that the temperature becomes appropriate for the reaction through which the fuel for conversion is converted. The converting reaction progressing at the converter 75 may be various reactions such as a water vapor converting reaction, a partial oxidative reaction, or a combination of both of them. The converting catalyst with which the converter 75 is provided should be chosen according to the converting reaction progressing at the converter 75.

The converted gas generated at the converter 75 is supplied to the anode side of the fuel cell 20 as fuel gas after its carbon monoxide concentration is reduced at the CO reducing portion 76. The CO reducing portion 76 includes a catalyst promoting a shift reaction which generates carbon dioxide and hydrogen from carbon monoxide and water vapor. Therefore, the CO reducing portion 76 can be referred to as a shift portion for reducing the carbon monoxide concentration of the hydrogen-rich gas by the shift reaction. In addition, the CO reducing portion 76 can also be referred to as a carbon monoxide selective oxidizing portion, provided with a catalyst promoting a selective oxidation reaction which oxidizes carbon monoxide in preference to hydrogen, for reducing the carbon monoxide concentration of the hydrogen-rich gas by the carbon monoxide selective oxidation reaction. Furthermore, the CO reducing portion 76 may be provided with a catalyst promoting the shift reaction and a catalyst promoting the selective oxidation reaction.

Compressed air as an oxidizing gas is supplied on the cathode side of the fuel cell 20 from the blower 77. Electromotive force is generated at the fuel cell 20 through an electrochemical reaction by utilizing the fuel gas and oxidizing gas.

The fuel cell 20 is a solid polymer type fuel cell. Detailed configuration of the fuel cell 20 will be explained later.

Figure 2:
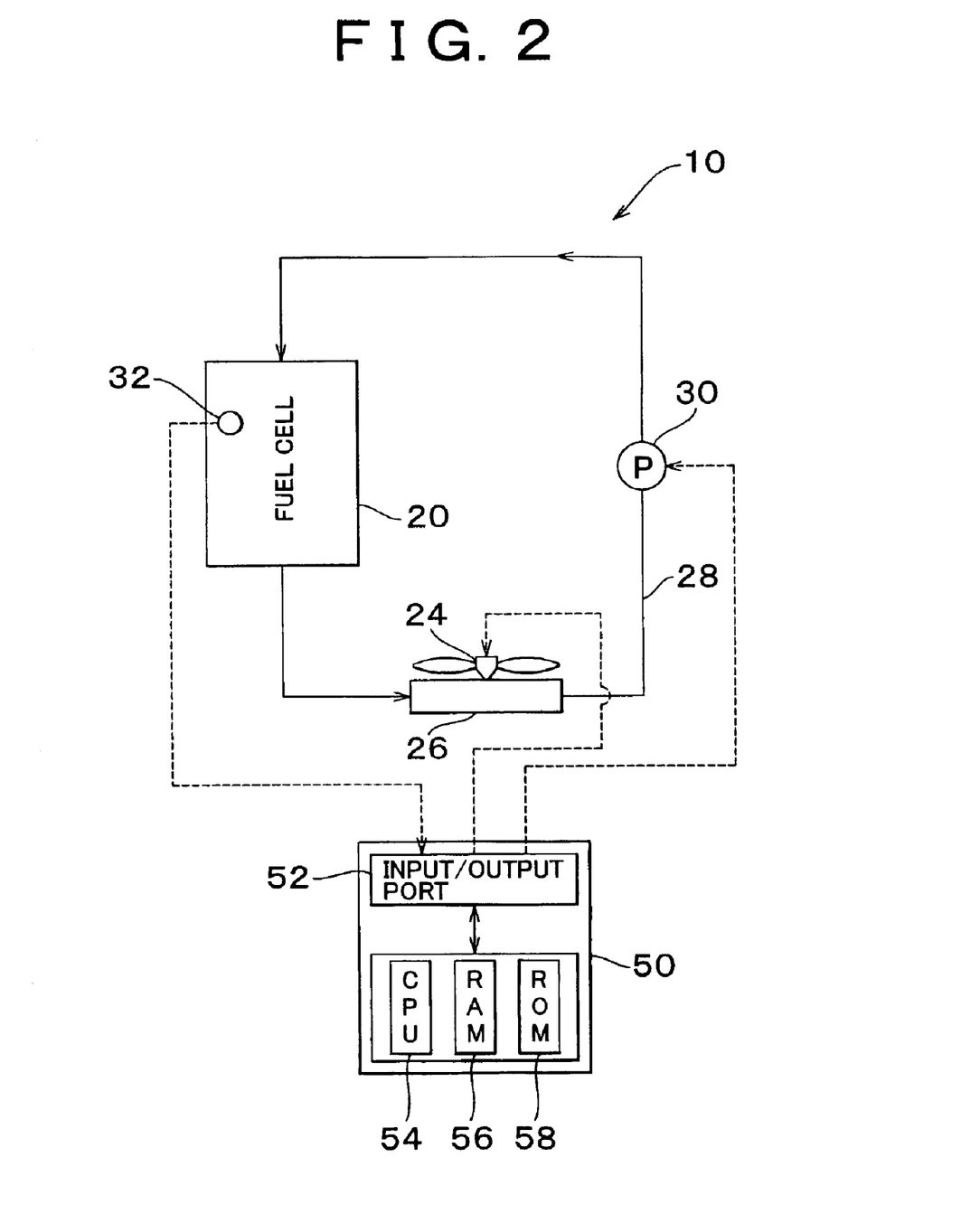
FIG.2 is an explanatory drawing showing the flow of cooling water in the fuel system.

Overall Configuration of the Device (Flow of Cooling Water):

FIG. 2 is an explanatory drawing showing the flow of the cooling water in the fuel cell system 10 (it is noted that the term "cooling water" can include any liquid used for cooling). The fuel system 10 includes a radiator 26, a cooling water channel 28, a cooling water pump 30 and a control portion 50. The radiator 26 includes a cooling fan 24. The cooling water channel 28 connects to a cooling water channel formed in the fuel cell 20 and one formed in the radiator 26 to circulate the cooling water in both of them. The cooling water pump 30 generates a driving force for circulating the cooling water in the cooling water channel 28. Meanwhile, the channel for cooling medium's passage which is formed in the fuel cell 20 is referred to as a cooling medium channel.

In the fuel cell in which the electrochemical reaction accompanied by heat generation progresses, an internal temperature of the fuel cell 20 is maintained within a predetermined range for favorable progress of the electrochemical reaction by circulating the cooling water in the channel provided in the fuel cell 20. In the present preferred embodiment, an antifreeze liquid, which does not freeze at temperatures equal to or somewhat less than 0 degrees, is used as the cooling liquid to allow circulation in the fuel system even when the fuel system 10 is activated in cold climates where the temperature is equal to or somewhat less than 0 degrees. Therefore, the present preferred embodiment does not necessitate a configuration for extracting the cooling water when the fuel cell stops operating.

The radiator 26 is a device for lowering a temperature of the cooling water which has been supplied to, and has been heated by exchanging heat in, the fuel cell 20. The radiator 26 is provided with a heat exchanging portion including the channel for introducing the heated cooling water. The heat exchanging portion allows outside air to penetrate therethrough so that the outside air and the cooling water in the channel can exchange heat. When the cooling fan 24 included in the radiator 26 is driven, cooling air passes the heat exchanging portion and draws heat from the cooling water circulating in the channel. As a result, the cooling water is efficiently cooled. The cooling fan 24 is connected to the control portion 50, and is controlled by the control portion 50.

As described previously, the cooling water pump 30 is a device for generating the moving force for circulating the cooling water in the cooling water channel 28, and a driving amount (speed of revolutions of the cooling water pump or a pumping amount of the cooling water) can be adjusted according to a drive voltage. In the present preferred embodiment, the pumping amount of the cooling water is adjusted by changing the drive voltage of the cooling water pump 30 to average a temperature distribution in the fuel cell 20. Therefore, it is preferable that the water pump 30 included in the fuel cell system 10 be capable of adjusting a flow rate of the cooling water to sufficiently average the temperature distribution in the fuel cell 20 even if an output electric current fluctuates greatly and a heat value at the fuel cell 20 changes. The cooling water pump 30 is connected to the control portion 50 which controls the drive voltage of the pump.

Meanwhile, a temperature sensor 32 for detecting the internal temperature of the fuel cell 20 is provided in the fuel cell 20. The temperature sensor 32 is connected to the control portion 50.

The control portion 50 is a logical circuit with a microcomputer as its center, including a CPU 54, ROM 58, RAM 56, and an input/output port 52 for inputting and outputting various signals. As described previously, the control portion 50 inputs information about the internal temperature of the fuel cell 20 from the temperature sensor 32 and outputs drive signals at the cooling fan 24 and the cooling water pump 30. In other words, the control portion 50 performs controls according to the internal temperature of the fuel cell 20 (status of the heat generation) so that an operating temperature of the fuel cell 20 is constantly equal to or less than a predetermined temperature (e.g., 80 degrees). In addition to controlling the cooling water affecting the internal temperature of the fuel cell 20, the control portion 50 controls pumps and valves which operate upon operation of the fuel cell 20. Furthermore, the control portion 50 controls the amount of gas supplied to the fuel cell 20.

Figure 3:
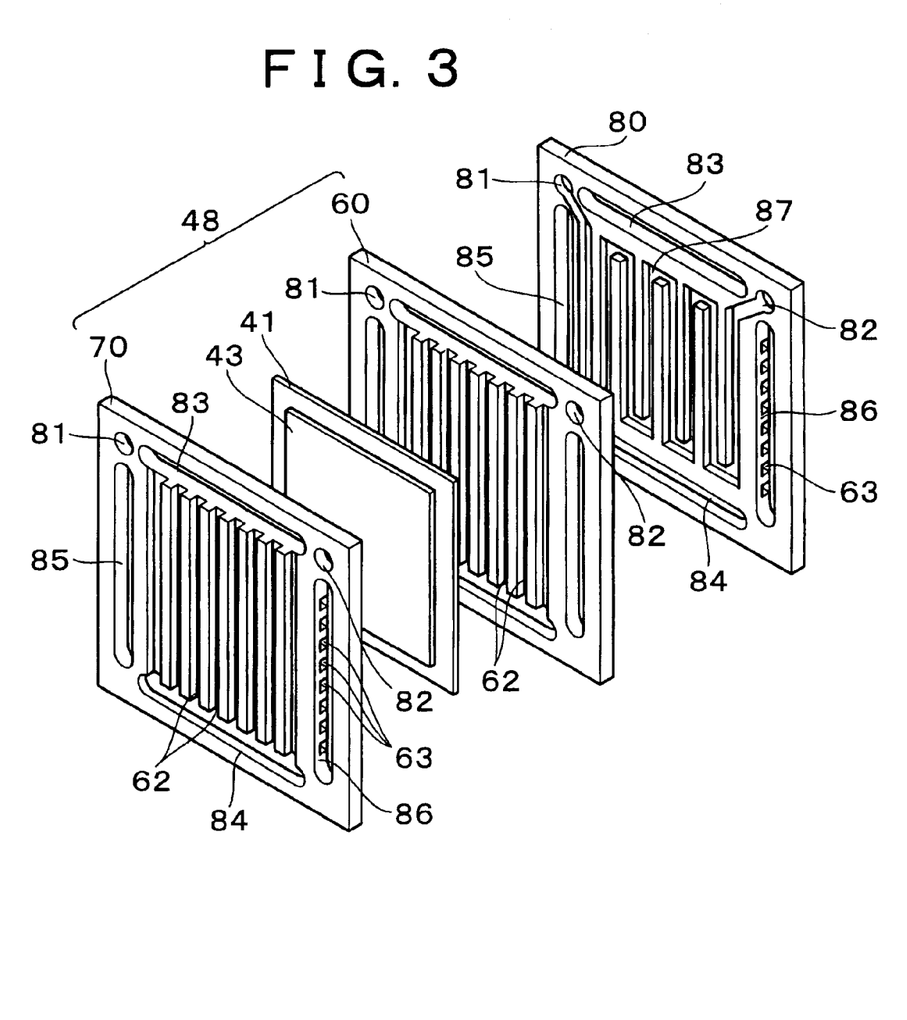
FIG. 3 is an exploded perspective view showing parts comprising a fuel cell.

Internal Configuration of a Fuel Cell 20:

FIG. 3 is an exploded perspective view showing parts comprising the fuel cell 20. The fuel cell 20 includes an electrolyte membrane 41 whose surfaces in a stacking direction are square, an anode 43 which is a gas diffusion electrode, a cathode (not shown), and separators 60, 70 and 80. In addition, the fuel cell 20 has a stack structure in which plural single cells 48 are stacked in layers.

The electrolyte membrane 41 is an ion exchange membrane with proton conductivity formed from a solid polymeric material such as fluorocarbon resin, and it has good electric conductivity under wet conditions. In the present preferred embodiment, a Nafion membrane (manufactured by Du Pont) is used as the electrolyte membrane 41. An alloy layer composed of platinum as a catalyst or platinum and other metals, is provided on the surface of the electrolyte membrane 41.

The anode 43 and the cathode are formed from carbon fiber. For example, they can be formed from carbon cross, carbon paper, or carbon felt.

The separators 60, 70 and 80 are formed from a conducting material which gas does not permeate, such as dense carbon formed by compressing the carbon or other metals. The separators 60, 70 and 80 include cooling water openings 81 and 82 whose cross sections are circular. The cooling water openings 81 are located so that their locations correspond to each other when the separators 60, 70 and 80 are stacked in layers. Likewise, the cooling water openings 82 are located so that their locations correspond to each other. A pair of elongate oxidizing gas openings 83 and 84 and a pair of fuel gas openings 85 and 86 are provided around and parallel to the edges of the surfaces of the separators 60, 70 and 80 in the stacking direction. In addition, predetermined uneven portions (ribs 62 and 63 which are located parallel to each other in the present preferred embodiment) for forming gas channels are provided on the surfaces of the separators 60, 70 and 80. The ribs 62 are connected to the oxidizing gas openings 83 and 84, and the ribs 63 are connected to the fuel gas openings 85 and 86.

The anode 43 and the cathode form a sandwich structure which sandwiches the electrolyte membrane 41 from both sides. The separators 60 and 70 further sandwich the sandwich structure from both sides, and form fuel gas channels and oxidizing gas channels between the anode 43 and the cathode. The fuel gas channels are formed by the ribs 63 included in the separator 70, and the anode 43. The oxidizing gas channels are formed by the ribs 62 included in the separator 60, and the cathode.

In the fuel cell 20, as shown in FIG. 3, the single cell 48 comprises the anode 43 and the cathode by which the electrolyte membrane 41 is sandwiched, and the separators by which the anode 43 and the cathode are sandwiched. The separator 70 shown in FIG. 3 is provided with the ribs 62 on the near side and the ribs 63 on the backside. On the other hand, the separator 60 is provided with the ribs 62 on one side (the near side in FIG. 3) and a flat surface with no ribs on the other side (the backside in FIG. 3). Though only one separator 70 is shown in FIG. 3, a predetermined number of the single cells 48 are formed by further providing the sandwich structures and stacking the predetermined number of the separators 70 in layers in the fuel cell 20. Then the separator 60 and the separator 80 are provided every time a predetermined number of the single cells 48 are stacked in layers.

The separator 80 is provided with the ribs 63 on one side (the backside in FIG. 3) and zigzag grooves 87 on the other side (the near side in FIG. 3). The grooves 87 of the separator 80 are connected to the cooling water openings 81 and 82. In addition, the flat surface on the separator 60 and the grooves 87 form a cooling water channel. As described above, the cooling water channel, parallel to the stacked layers, is formed every time the predetermined number of the single cells 48 are stacked in layers. As shown in FIG. 3, the grooves 87 forming the cooling water channel are formed on the entire surface except around the edges of the separator 80. Therefore, heat generated through the electrochemical reaction which progresses on the electrolyte membrane 41 can efficiently be removed by the cooling water.

In the fuel cell 20 in which the above-mentioned parts are stacked in layers, the cooling water openings 81 and 82 form cooling water manifolds which are cooling water channels and penetrate the stack in the stacking direction. The oxidizing gas openings 83 and 84 form oxidizing gas manifolds which are oxidizing gas channels and penetrate the stack in the stacking direction. The fuel gas openings 85 and 86 form fuel gas manifolds which are fuel gas channels and penetrate the stack in the stacking direction.

The cooling water supplied by the cooling water channel 28 after flowing out of the radiator 26, is dispensed to the cooling water channels formed by the grooves 87 of the separators 80 to exchange heat after flowing through the cooling water manifold formed by the cooling water openings 81. The cooling water, heated through heat exchange gathers in the cooling water manifold formed by the cooling water openings 82. Then the cooling water is discharged from the fuel cell 20, and is cooled at the radiator 26. The fuel gas supplied from the CO reducing portion 76 shown in FIG. 1, is dispensed to the fuel gas channels formed by the separators 60, 70 and 80, and the anode 43, to be supplied to the electrochemical reaction through the fuel gas manifold formed by the fuel gas openings 85. The fuel gas supplied to the electrochemical reaction, gathers in the fuel gas manifold formed by the fuel gas openings 86, and is discharged from the fuel cell 20. The oxidizing gas supplied from the blower 77 shown in FIG. 1 is dispensed to the oxidizing gas channels formed by each separator and the cathode, to be supplied to the electrochemical reaction through the oxidizing gas manifold formed by the oxidizing gas openings 83. The oxidizing gas supplied to the electrochemical reaction, gathers in the oxidizing gas manifold formed by the oxidizing gas openings 84 and is discharged from the fuel cell 20.

Figure 4:
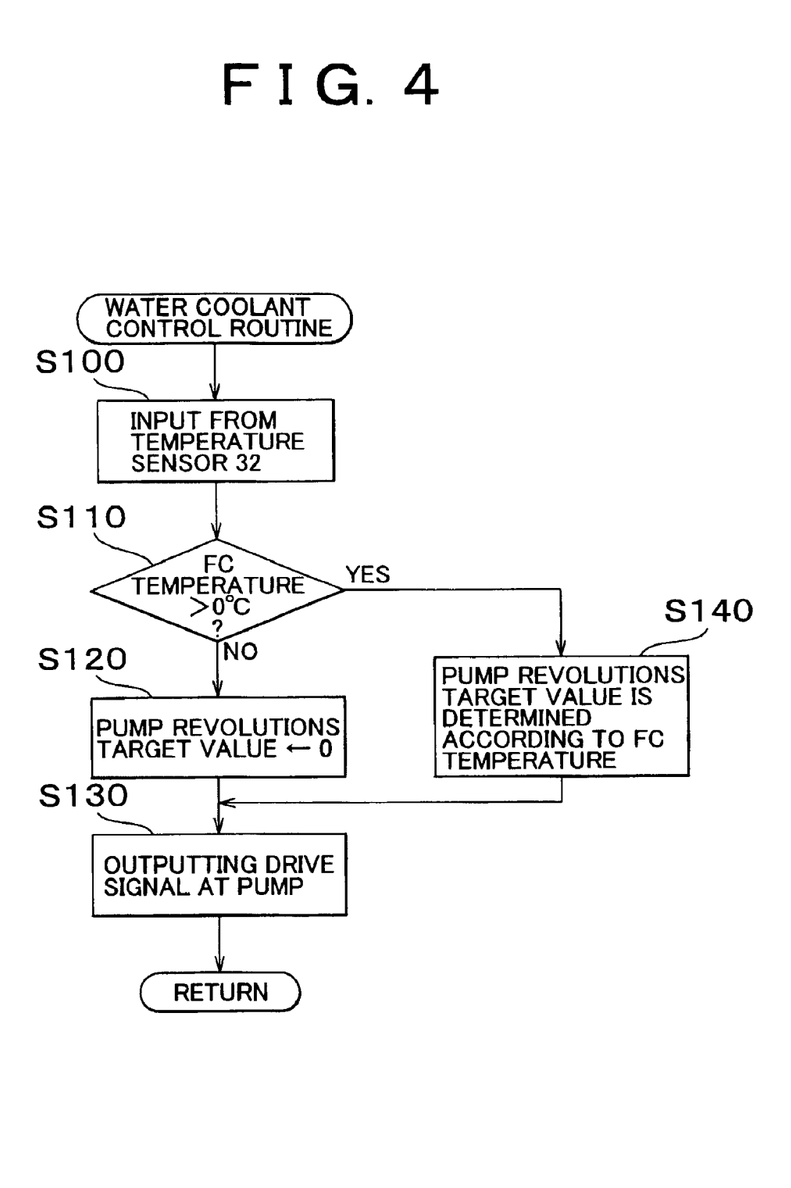
FIG. 4 is a flow chart showing a cooling water control routine.

Control of Cooling Water Flow:

FIG. 4 is a flow chart showing the cooling water control routine carried out by the control portion 50 every after a predetermined time beginning from activation of the fuel cell 20. When the present routine is initiated, the control portion 50 inputs the internal temperature of the fuel cell 20 detected by the temperature sensor 32 (step S100). Then the control portion 50 determines whether or not the internal temperature of the fuel cell 20 is higher than 0 degrees according to a detection signal from the temperature sensor 32 (step S110).

If the control portion 50 determines the internal temperature of the fuel cell 20 to be equal to or lower than 0 degrees at step S110, it sets a target value of the speed of revolutions of the water pump 30 to zero (step S120). Then the control portion 50 outputs a drive signal according to the set target value at the water pump 30 (step S130), and ends the present routine.

Figure 5:
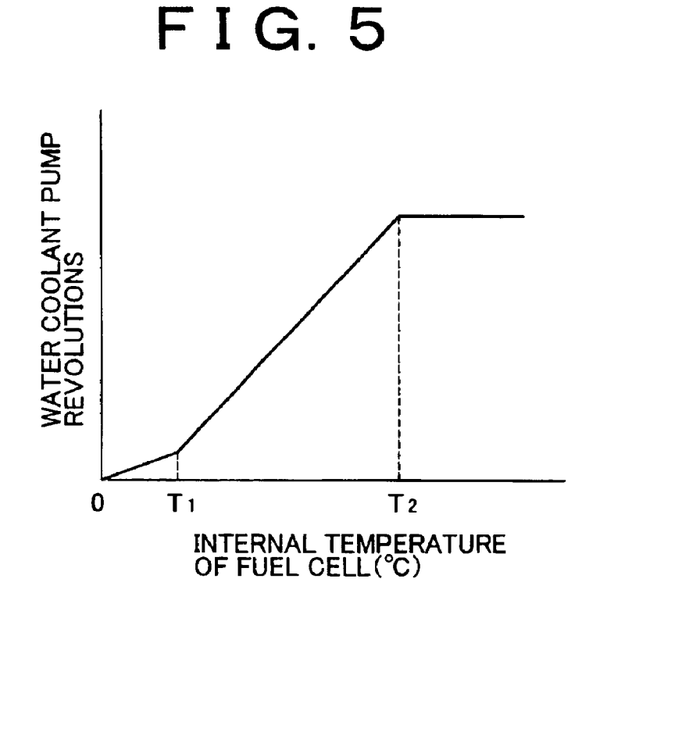
FIG. 5 is a map showing a relation between an internal temperature of the fuel cell and target values of cooling water pump speed in revolutions.
Figure 6:
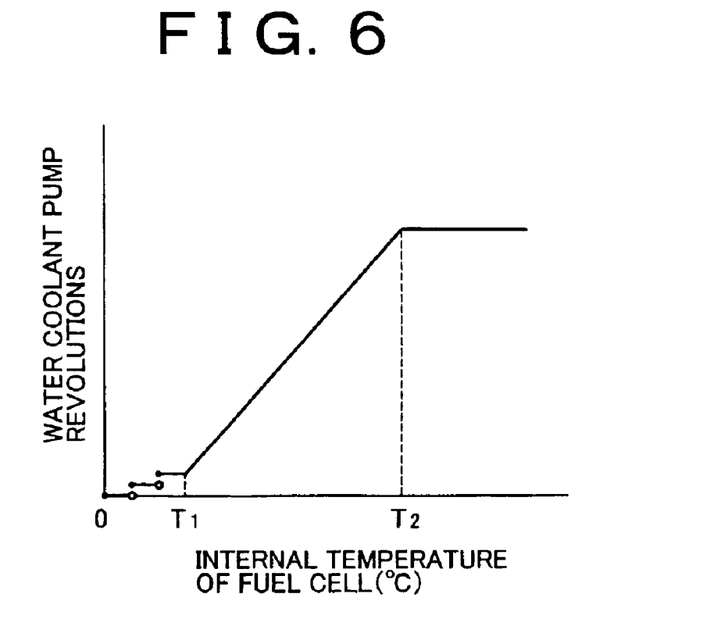
FIG. 6 is a map showing a relation between the internal temperature of the fuel cell and the target values of cooling water pump speed in revolutions.

If the control portion 50 determines the internal temperature of the fuel cell 20 to be equal to or higher than 0 degrees at step S110, it determines the target value of revolutions of the water pump 30 according to the detected internal temperature of the fuel cell 20 (step S140). FIG. 5 is an explanatory drawing showing a map prestored in the control portion 50 to determine the target value of revolutions of the water pump 30 according to the internal temperature of the fuel cell 20. As shown in FIG. 5, the target value of revolutions of the water pump 30 gradually increases as the internal temperature of the fuel cell 20 rises up to a temperature T2. In addition, when the internal temperature of the fuel cell 20 is equal to or lower than a temperature T1, a rate of increase in revolutions of the pump is set to be lower than that of the pump when the internal temperature of the fuel cell 20 is higher than the temperature T1. When the internal temperature of the fuel cell is equal to or higher than the temperature T2, the target value of revolutions of the water pump 30 is set to be a maximum value. At step S140, the control portion 50 determines the target value of revolutions of the water pump 30 according to the map shown in FIG. 5, in other words according to the internal temperature of the fuel cell 20 detected at step S100. Then the control portion 50 outputs the drive signal according to the target value determined according to the internal temperature of the fuel cell 20 at step S140, at the water pump 30 (step S130), and ends the present routine.

According to the fuel cell system 10 of the present preferred embodiment with the configuration described above, the water pump 30 is not driven when the internal temperature of the fuel cell 20 is equal to or lower than 0 degrees. Therefore, mainly, the electrolyte membrane 41 can begin to be heated immediately after initiation of the electrochemical reaction in the fuel cell 20 when the fuel cell system 10 is activated at an internal temperature of the fuel cell equal to or lower than 0 degrees. When the fuel cell is activated under cold conditions where the internal temperature of the fuel cell 20 is equal to or lower than 0 degrees, the temperature of the cooling water circulating in the cooling water channel 28 is also low, which is equal to or lower than 0 degrees. If the cooling water pump 30 is driven simultaneously with the initiation of the electrochemical reaction, heat is exchanged between the low-temperature cooling water and the fuel cell 20. Therefore, a rise in internal temperature of the fuel cell 20 is restrained even after the initiation of the electrochemical reaction in the fuel cell 20. To resolve the above problem, the cooling water pump 30 is not driven. In other words, normal cooling steps are not carried out in the present preferred embodiment when the internal temperature of the fuel cell 20 is equal to or lower than 0 degrees. Therefore, the heat generation accompanied by the electrochemical reaction is not restrained when the fuel cell 20 is activated. As a result, the internal temperature in the fuel cell 20 rises sufficiently, so that the internal temperature can rapidly be raised to higher than 0 degrees.

In the present preferred embodiment as described above, the internal temperature of the fuel cell 20 can rapidly be raised, so that water generated by the electrochemical reaction can be prevented from freezing in the fuel cell 20 when the internal temperature of the fuel cell 20 becomes equal to or lower than 0 degrees after the fuel cell 20 is activated. If the internal temperature becomes equal to or lower than 0 degrees after the fuel cell is activated and the water forms, progress of the electrochemical reaction may be interrupted because the generated water freezes on the solid polymeric membranes. In addition, the flow of the gas may also be interrupted because the generated water freezes in the gas channels in the single cells. In the present preferred embodiment, the above-mentioned problems caused by the freezing of the generated water can also be prevented by not driving the cooling water pump 30 when the internal temperature of the fuel cell 20 is equal to or lower than 0 degrees.

Furthermore, in the present preferred embodiment, when driving the cooling water pump 30 after the internal temperature of the fuel cell 20 exceeds 0 degrees, the rate of increase in the speed of revolutions of the pump to the internal temperature is kept low until the internal temperature reaches a predetermined temperature (the temperature T1 shown in FIG.5), compared with that of the pump if the internal temperature exceeds the predetermined temperature. In other words, a circulation velocity of the cooling water is kept low when the internal temperature is equal to or lower than the predetermined temperature. Therefore, the internal temperature does not drop down to equal to or lower than 0 degrees after the electrochemical reaction is initiated in the fuel cell 20 because the cooling water is not circulated at a normal circulation velocity unless the internal temperature exceeds the predetermined temperature. As a result, the generated water can be prevented from freezing in the fuel cell 20.

As described above, the internal temperature of the fuel cell 20 immediately begins to rise when the fuel cell system 10 is activated even under cold conditions where the internal temperature of the fuel cell 20 is equal to or lower than 0 degrees. However, the temperature of the cooling water circulating in the cooling water channel 28 is equal to or lower than 0 degrees when the fuel cell system 10 is activated under the cold conditions, and is kept low when the cooling water pump 30 is at rest. Therefore, if the cooling water pump is driven, the low-temperature cooling water is supplied in the fuel cell 20 from the cooling water channel 28 located outside the fuel cell 20, so that the interior of the fuel cell 20 is cooled. If the interior of the fuel cell 20 is rapidly cooled by the low-temperature cooling water, the internal temperature of the fuel cell 20, which has started generating heat, may drop down to equal to or lower than 0 degrees. In the present preferred embodiment, the driving amount of the cooling water pump 30 is restrained as long as the internal temperature of the fuel cell reaches the predetermined temperature which is higher than 0 degrees (the temperature T1 shown in FIG. 5) to prevent the interior of the fuel cell 20 from being cooled rapidly. A value of the temperature T1 is set to the internal temperature of the fuel cell 20, which is higher than 0 degrees, when the driving amount of the cooling water pump 30 is adjusted according to normal controls under a predetermined cold condition. The value of the temperature T1, for example, may be set according to a heat capacity of the fuel cell 20 calculated from the size and material of the fuel cell 20, a heat capacity of the entire circulating cooling water, and/or a heat exchange efficiency between the cooling water and the fuel cell 20. In addition, the temperature T1 may also be determined according to an experiment under a predetermined cold condition.

Furthermore, the rate of increase in revolutions of the cooling water pump to a rise in internal temperature may also be set according to the heat capacity of the fuel cell 20, the heat capacity of the entire circulating cooling water, and/or the heat exchange efficiency between the cooling water and the fuel cell 20 as needed. According to these, the rate of increase in revolutions of the cooling water pump at temperatures equal to or lower than the temperature T1 may be preset so that the internal temperature of the fuel cell 20 does not drop down to equal to or lower than 0 degrees when the cooling water pump 30 is driven once the internal temperature of the fuel cell 20 has exceeded 0 degrees.

In the present preferred embodiment, the rate of increase in revolutions as the target value of the cooling water pump to the rise in internal temperature of the fuel cell 20 becomes higher when the internal temperature of the fuel cell 20 exceeds the temperature T1. However, different controls can be carried out. For example, the rate of increase in revolutions of the cooling water pump to the rise in internal temperature may become higher when the internal temperature of the fuel cell 20 exceeds a certain temperature at plural temperature points instead of only the temperature T1. In addition, a range where the rate of increase in revolutions as the target value of the cooling water pump is gradually heightened may be set. Furthermore, the target value of revolutions of the water pump may be set to be constant when the internal temperature of the fuel cell 20 is within a predetermined temperature range close to 0 degrees. An effect of preventing the generated water from freezing in the fuel cell 20 can be achieved by restraining the driving status of the cooling water pump 30 when the internal temperature of the fuel cell 20 is constant and higher than 0 degrees.

Example Alternations in Configuration:

Meanwhile, this invention is not limited to the preferred embodiment and the above aspects. It can be embodied in various aspects within the scope of the invention. For example, the following alternations are possible.

E1. Example Alternation in Configuration 1:

Though the target value of the speed of revolutions of the cooling water pump 30 is determined according to the prestored map shown in FIG. 5 according to the preferred embodiment above, the control method may be altered according to the internal temperature of the fuel cell 20. For example, the target value of revolutions of the cooling water pump may be corrected by again detecting the internal temperature of the fuel cell 20 after driving the cooling water pump 30 according to the target value determined from the FIG. 5. Specifically, the target value of revolutions of the cooling water pump is corrected to a lower value if the internal temperature of the fuel cell 20 drops down to equal to lower than 0 degrees as a result of driving the cooling water pump 30 according to the target value of revolutions, or if a degree of drop in internal temperature exceeds a predetermined allowable value. As described above, the generated water can more securely be prevented from freezing in the fuel cell 20 by correcting the target value of revolutions of the cooling water pump according to the internal temperature of the fuel cell 20. In addition, the target value of revolutions of the cooling water pump may be corrected to a higher value if the internal temperature of the fuel cell 20 rises as the cooling water pump 30 is driven, and a degree of the rise in internal temperature exceeds a predetermined allowable value. Therefore, the entire fuel cell system 10 can more efficiently be warmed up.

E2. Example Alternation in Configuration 2:

Though the cooling water pump 30 is not driven unless the internal temperature of the fuel cell 20 rises to the predetermined temperature in the preferred embodiment above, it is possible not to directly utilize a detected value of the internal temperature of the fuel cell 20 when determining whether or not it is necessary to drive the cooling water pump 30. For example, it is allowable not to drive the cooling water pump 30 for a predetermined length of time when the fuel cell system 10 is activated. Though it is allowable not to drive the cooling water pump 30 for a predetermined length of time whenever the fuel cell system 10 is activated, it should not be activated for a predetermined length of time when, at least, the internal temperature of the fuel cell 20 is equal to or less than a predetermined value upon activation of the fuel cell system 10. Therefore, if the length of time not to drive the cooling water pump 30 is determined, the generated water can more securely be prevented from freezing in the fuel cell 20, and the internal temperature of the fuel cell 20 can be prevented from dropping excessively by not circulating the cooling water.

E3. Example Alternation in Configuration 3:

Though the rate of increase in revolutions of the cooling water pump is restrained when the internal temperature of the fuel cell 20 ranges from 0 degrees to the temperature T1, the speed of revolutions of the cooling water pump is increased according the internal temperature of the fuel cell 20 as in the case of the internal temperature exceeding the temperature T1 as shown in FIG. 5 in the preferred embodiment above. On the other hand, the target value of revolutions of the cooling water pump may be set to increase step by step as the internal temperature of the fuel cell 20 rises from 0 degrees to the temperature T1. If the internal temperature of the fuel cell 20 is between 0 degrees and the temperature T1 which is a low temperature close to 0 degrees and the driving amount of the cooling water pump 30 is set to a lower value, an effect similar to the one which prevents drop in internal temperature of the fuel cell 20 down to equal to or lower than 0 degrees caused by circulation of the cooling water can be achieved.

E4. Example Alternation in Configuration 4:

Though the driving amount (speed of revolutions) of the cooling water pump 30 is controlled to control the flow rate of the cooling water according to the internal temperature when the internal temperature of the fuel cell 20 exceeds 0 degrees in the preferred embodiment, the flow rate of the cooling water can be controlled by different methods. For example, a valve capable of changing an open area of the cooling water channel 28 may be provided at a predetermined position of the cooling water channel 28. With this configuration, the flow rate of the cooling water can be controlled even if the driving amount of the cooling water pump 30 is constant. In the case of increasing the flow rate of the cooling water according to the rise in internal temperature of the fuel cell 20, an effect similar to the one, which prevents the generated water from freezing, can be achieved by restraining a degree of increase in flow rate when the internal temperature is equal to or lower than the temperature T1.

E5. Example Alternation in Configuration 5:

A plurality of the temperature sensors 32 for detecting the internal temperature of the fuel cell 20 may be provided in the fuel cell 20 to generally determine the internal temperature of the fuel cell 20 according to detection results from each sensor. Furthermore, the temperature sensors 32 may be provided around a connection between the cooling water channel 28 which connects the fuel cell 20 and the radiator 26, and the fuel cell 20 in addition to being provided in the fuel cell 20. Any sensors which detect values reflecting the internal temperature of the fuel cell 20 may be provided. The point is that whether the generated water may freeze or not in the fuel cell 20 should be determined according to detection results from the sensors.

E6. Example Alternation in Configuration 6:

Though whether or not it is necessary to drive the cooling water pump 30 is determined according to whether or not the internal temperature of the fuel cell 20 is equal to or lower than 0 degrees as shown in FIG. 4 in the preferred embodiment above, it may be determined according to other determination standard temperatures. For example, a temperature higher than 0 degrees (5 degrees or 10 degrees) may be set as the determination standard temperature to determine whether or not it is necessary to drive the cooling water pump 30. The determination standard temperature is set to more securely prevent the generated water from freezing in consideration of a detection accuracy of the temperature sensor 32 and internal temperature variations of each cell comprising the fuel cell 20. However, when the fuel cell 20 is activated, the temperature around the electrolyte membrane 41 rapidly rises. Therefore, it is preferable that the determination standard temperature be set in consideration of a heat resistance of the electrolyte membrane so that circulation of the cooling water is initiated when a temperature around the electrolyte membrane 41 is allowable. As described above, an effect which prevents the generated water from freezing upon activation of the fuel cell under cold conditions can be achieved by setting the determination standard temperature to around 0 degrees (e.g., −10 degrees~+10 degrees) as needed.

E7. Example Alternation in Configuration 7:

As shown in FIG. 4, whether or not it is necessary to drive the cooling water pump 30 is determined according to whether or not the internal temperature of the fuel cell 20 is higher than the predetermined determination standard temperature (0 degrees) in the preferred embodiment above. With this configuration, the cooling water pump is turned off when the internal temperature of the fuel cell 20 drops down to equal to or lower than 0 degrees after driving of the cooling water pump 30. On the other hand, two different determination standard temperatures may be set so that one determination standard temperature is utilized when driving the cooling water pump 30 because of a rise in internal temperature of the fuel cell 20, and the other one is utilized when turning off the cooling water pump 30 because of a drop in internal temperature of the fuel cell 20. In other words, a first determination standard temperature, which is for determining whether or not the cooling water pump 30 should be driven when the fuel cell 20 is activated under cold conditions may be set higher than a second determination standard temperature for turning off the cooling water pump 30. For example, the first determination standard temperature can be set to 5 degrees, and the second determination standard temperature can be set to 0 degrees. With this configuration, the cooling water pump 30 is not turned off immediately even if the internal temperature of the fuel cell 20 drops to a certain degree after driving of the cooling water pump 30. Therefore, hunting can be prevented to stabilize the driving timing control of the water pump 30 when the fuel cell 20 is activated under cold conditions.

Figure 7:
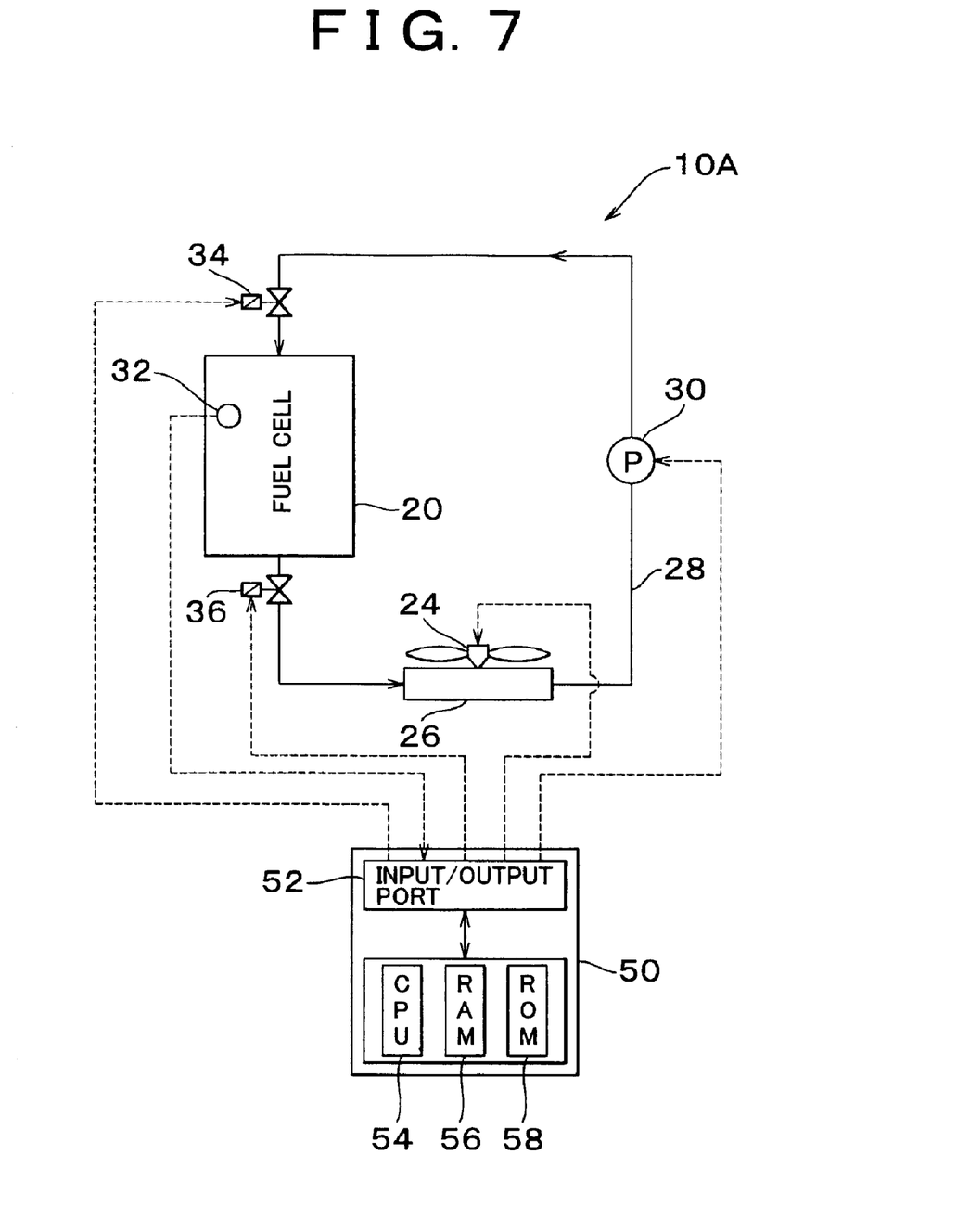
FIG. 7 is an explanatory drawing showing an altered example of a fuel cell system.

E8. Example Alternation in Configuration 8:

FIG. 7 is an explanatory drawing showing a fuel cell system 10A as an example alternation in configuration of the fuel cell system 10 in the preferred embodiment above. FIG. 7, like FIG. 2, shows the configuration related to the cooling water channel, and parts common to the ones in FIG. 2 are marked with the same reference numbers. The fuel cell system 10A is provided with valves 34 and 36 on an inlet side and outlet side, respectively, of connections between the cooling water channel 28 and the fuel cell 20. The valves 34 and 36 are connected to the control portion 50 and are controlled so that they are open when the cooling water pump 30 is driven, and they are closed when the cooling water pump 30 is at rest. With this configuration, adiathermancy between the cooling water in the fuel cell 20 and that in the cooling water channel 28 located outside the fuel cell 20 improves. Therefore, a rising speed of the internal temperature of the fuel cell 20 can be increased to a greater extent when the fuel cell 20 is activated compared with the case where the cooling water channel is connected through the fuel cell 20. As a result, the electrochemical reaction is intensified more rapidly, and a time to warm up the fuel cell system can be shortened.

E9. Example Alternation in Configuration 9:

Furthermore, the fuel cell system 10A may have a configuration in which a valve for discharging water is provided at either the inlet or the outlet of the fuel cell 20 on the cooling water channel, and a portion of the cooling water is discharged to outside to reduce the amount of the cooling water accumulating in the fuel cell 20 when the cooling water pump 30 is at rest. By reducing the amount of the cooling water in the fuel cell 20, the heat capacity of the fuel cell 20 can be decreased when the fuel cell 20 is activated. Therefore, it is easier to warm up the fuel cell 20, and the time to warm up the fuel cell system can be shortened. In this case, the following steps may be carried out as needed. One step is to increase the amount of the cooling water to the normal amount when the internal temperature of the fuel cell 20 rises to a certain extent after the fuel cell 20 is activated (e.g., to store the cooling water discharged while the fuel cell had been at rest in a designated tank, and to resupply the cooling water to the cooling water channel). The other step is to drive the cooling water pump 30.

E10. Example Alternation in Configuration 10:

The shapes of the parts which the fuel cell 20 comprises have been shown in FIG. 3. However, the uneven portions for forming the cooling water channels and the gas channels may comprise parts with various shapes other than the ribs 62 and 63 and the grooves 87 shown in FIG. 3. The point is that the cooling water channels, at least, should be capable of exchanging heat with sufficient efficiency in an area where the electrochemical reaction accompanied by heat generation progresses, and that the gas channels, at least, should be capable of supplying a predetermined gas to the electrochemical reaction with sufficient efficiency.

E11. Example Alternation in Configuration 11:

The main parts of the fuel cell system 10 have been shown in FIG. 1. However, various kinds of fuels for conversion can be selected as described previously so that the parts of the fuel cell system 10 may be changed as needed according to a type of fuel for conversion. For example, if the fuel for conversion contains sulfur, a desulfurizer may be provided in front of the evaporating/mixing portion 74 to desulfurize the fuel for conversion. In addition, hydrogen gas instead of the converted gas may be used as fuel gas. By applying the present invention regardless of a configuration of a gas supply, an effect similar to the one which prevents the generated water from freezing in the fuel cell when the fuel cell system is activated in cold climate can be achieved.

What is claimed is:

1. A fuel cell system comprising:

a fuel cell that generates electricity by an electrochemical reaction;

a cooling medium channel which is formed in the fuel cell and through which a cooling medium passes;

a pump which moves the cooling medium through the cooling medium channel;

a temperature sensor positioned to detect a temperature reflecting an internal temperature of the fuel cell;

a control pardon which stops the pump when the temperature detected by the temperature sensor is equal to or lower than a first predetermined temperature, wherein the control portion drives the pump to adjust a flow rate of the cooling medium according to the temperature detected by the temperature sensor if the temperature exceeds the first predetermined temperature; and wherein the control portion controls the pump such that when the temperature detected by the temperature sensor is higher than the first predetermined temperature and is equal to or lower than a second predetermined temperature which is higher than the first predetermined temperature, a degree of increase in flow rate is kept lower compared with the degree of increase in flow rate according to a rise in temperature when the detected temperature is higher than the second predetermined temperature.

2. The fuel cell system according to claim 1, wherein:

the control portion is adapted to drive the pump after maintaining the pump stopped for a predetermined time when the fuel cell system is activated and the temperature detected by the temperature sensor is equal to or lower than the first predetermined temperature.

3. The fuel cell system according to claim 1, wherein:

the control portion stores preset values of the flow rate of the cooling medium according to the temperature detected by the temperature sensor.

4. The fuel cell system according to claim 3, wherein:

the control portion is adapted to drive the pump based on the preset flow rate of the cooling medium according to the temperature detected by the temperature sensor, and to correct the preset flow rate stored therein according to a temperature subsequently detected by the temperature sensor.

5. The fuel cell system according to claim 1, wherein:

the values of the flow rate of the cooling medium corresponding to temperatures ranging from the first predetermined temperature to the second predetermined temperature are set step by step.

6. The fuel cell system according to claim 1, wherein:

a plurality of the temperature sensors is provided in the fuel cell.

7. The fuel cell system according to claim 1, wherein:

the temperature senior is provided for at least the cooling medium channel for introducing the cooling medium between a radiator, which reduces a temperature of the cooling medium, and the fuel cell.

8. The fuel cell system according to claim 1, wherein:

the first predetermined temperature when the temperature reflecting the internal temperature of the fuel cell rises, is set higher than the first predetermined temperature when the temperature reflecting the internal temperature of the fuel cell drops.

9. The fuel cell system according to claim 1, further comprising:

valves provided at an inlet and an outlet of the cooling medium channel formed in the fuel cell, wherein the valves are controlled by the control portion, and wherein:

the valves are adapted to close to isolate the cooling medium in the fuel cell from the cooling medium outside the fuel cell when the pump stops.

10. The fuel cell system according to claim 1, wherein:

the pump discharges a portion of the cooling medium in the fuel cell when the pump stops.

11. The fuel cell system according to claim 9, wherein:

an open area of the valves is changed according to the temperature detected by the temperature sensor when the detected temperature is higher than the first predetermined temperature.

12. The fuel cell system according to claim 1, wherein:

the first predetermined temperature is 0 degrees.

13. The fuel cell system according to claim 1, wherein:

the cooling medium is a liquid whose freezing point is lower than that of water.

14. A freezing prevention method in a fuel cell system comprising steps of:

a. detecting a temperature reflecting an internal temperature of a fuel cell;

b. stopping a pump which controls a flow rate of a cooling medium in a cooling medium channel for circulating a cooling medium in the fuel cell when the temperature detected at the step (a) is equal to or lower than a first predetermined temperature; and c. driving the pump when the temperature detected at the step (a) is higher than the first predetermined temperature; wherein the step (c) includes:

a step of increasing a flow rate of the cooling medium according to the temperature detected at the step (a), and a step of keeping a degree of increase in flow rate lower, when the temperature detected at the step (a) is higher than the first predetermined temperature and is equal to or lower than a second predetermined temperature which is higher than the first predetermined temperature, compared with the degree of increase in flow rate when the detected temperature is higher than the second predetermined temperature.

15. The freezing prevention method according to claim 14, further comprising:

a step of driving the pump after maintaining the pump stopped for a predetermined time when the temperature detected at the step (a) in equal to or lower than the first predetermined temperature.

16. The freezing prevention method according to claim 14, wherein:

a driving amount of the pump at the step (c) corresponds to a rise in the detected temperature, and in preset according to the detected temperature.

17. The freezing prevention method according to claim 16, further comprising:

a step of redetecting the temperature after driving the pump by the driving amount according to the detected temperature, and a step of correcting the preset driving amount of the pump based on the redetected temperature.

18. The freezing prevention method according to claim 14, wherein:

the first predetermined temperature is set higher when the temperature reflecting the internal temperature of the fuel cell rises than the first predetermined temperature when the temperature reflecting the internal temperature of the fuel cell drops.

19. A fuel cell system comprising:

a fuel cell that generates electricity by an electrochemical reaction;

a cooling medium channel which is formed in the fuel cell and through which a cooling medium passes;

a pump which moves the cooling medium through the cooling medium channel;

a temperature sensor positioned to detect a temperature reflecting an internal temperature of the fuel cell;

a control portion which controls the pump such that the pump does not move the cooling medium through the cooling medium channel when the temperature detected by the temperature sensor is equal to or lower than a first predetermined temperature, wherein the control portion drives the pump to adjust a flow rate of the cooling medium according to the temperature detected by the temperature sensor if the temperature exceeds the first predetermined temperature; and wherein the control portion controls the pump such that when the temperature detected by the temperature sensor is higher than the first predetermined temperature and is equal to or lower their a second predetermined temperature which is higher than the first predetermined temperature, a degree of increase in flow rate is kept lower compared with the degree of increase in flow rate according to a rise in temperature when the detected temperature is higher than the second predetermined temperature.

* * * * *